FIG. 1 TOLL LINE CKT. 100

INVENTOR.
CLARENCE E. LOMAX
BY Wm. Walter Owen
ATTY.

LAMP CONTROL
CKT. 200

INVENTOR.
CLARENCE E. LOMAX
BY Wm. Walter Owen
ATTY.

INDICATING SYSTEMS
Filed Sept. 17, 1954 3 Sheets-Sheet 3
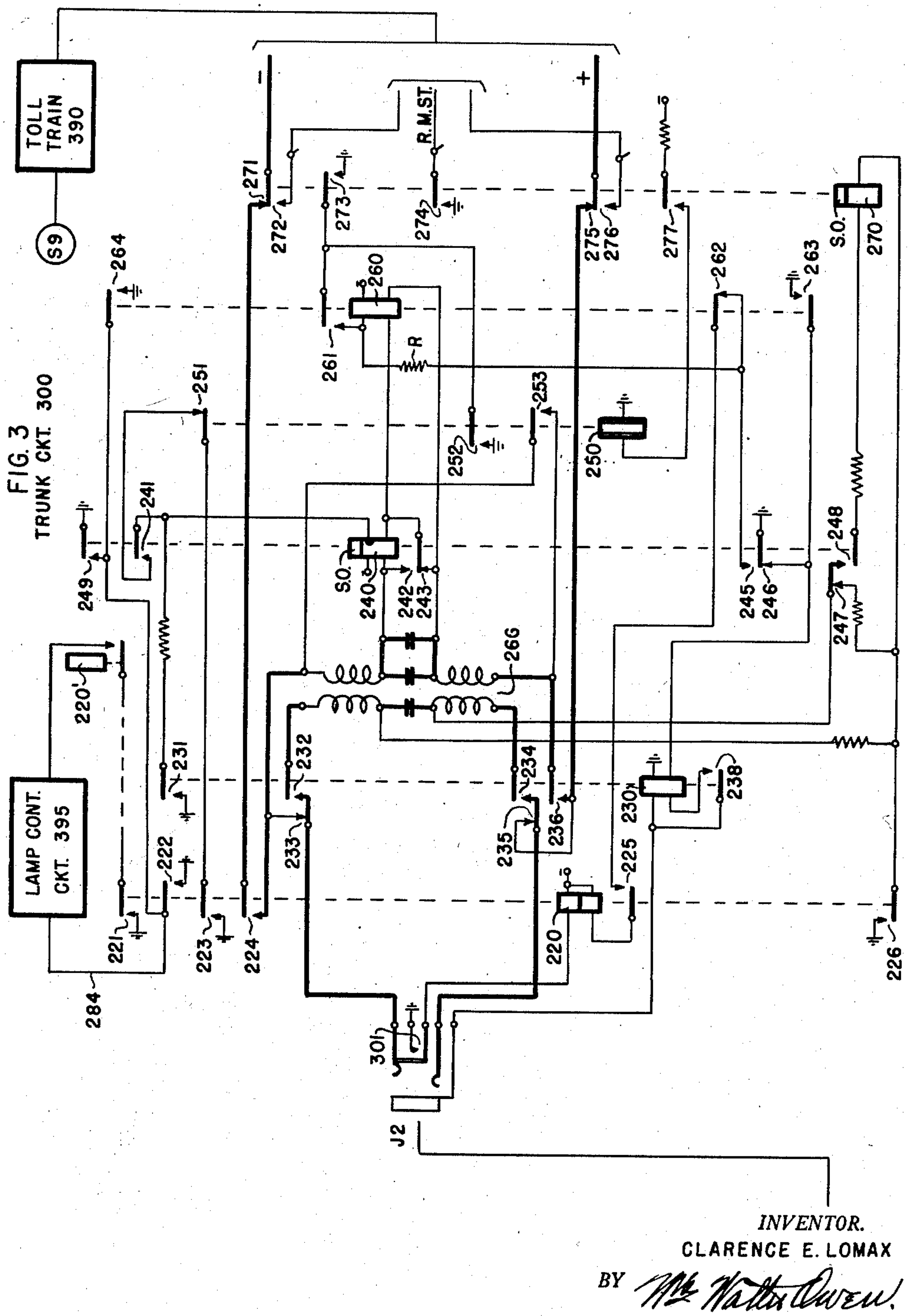
FIG. 3 TRUNK CKT. 300
INVENTOR.
CLARENCE E. LOMAX
BY [signature]
ATTY.

United States Patent Office 2,817,714
Patented Dec. 24, 1957

2,817,714

INDICATING SYSTEMS

Clarence E. Lomax, Chicago, Ill., assignor to General Telephone Laboratories, Incorporated, a corporation of Delaware Application September 17, 1954, Serial No. 456,672
9 Claims. (Cl. 179—41)

Figure 1:
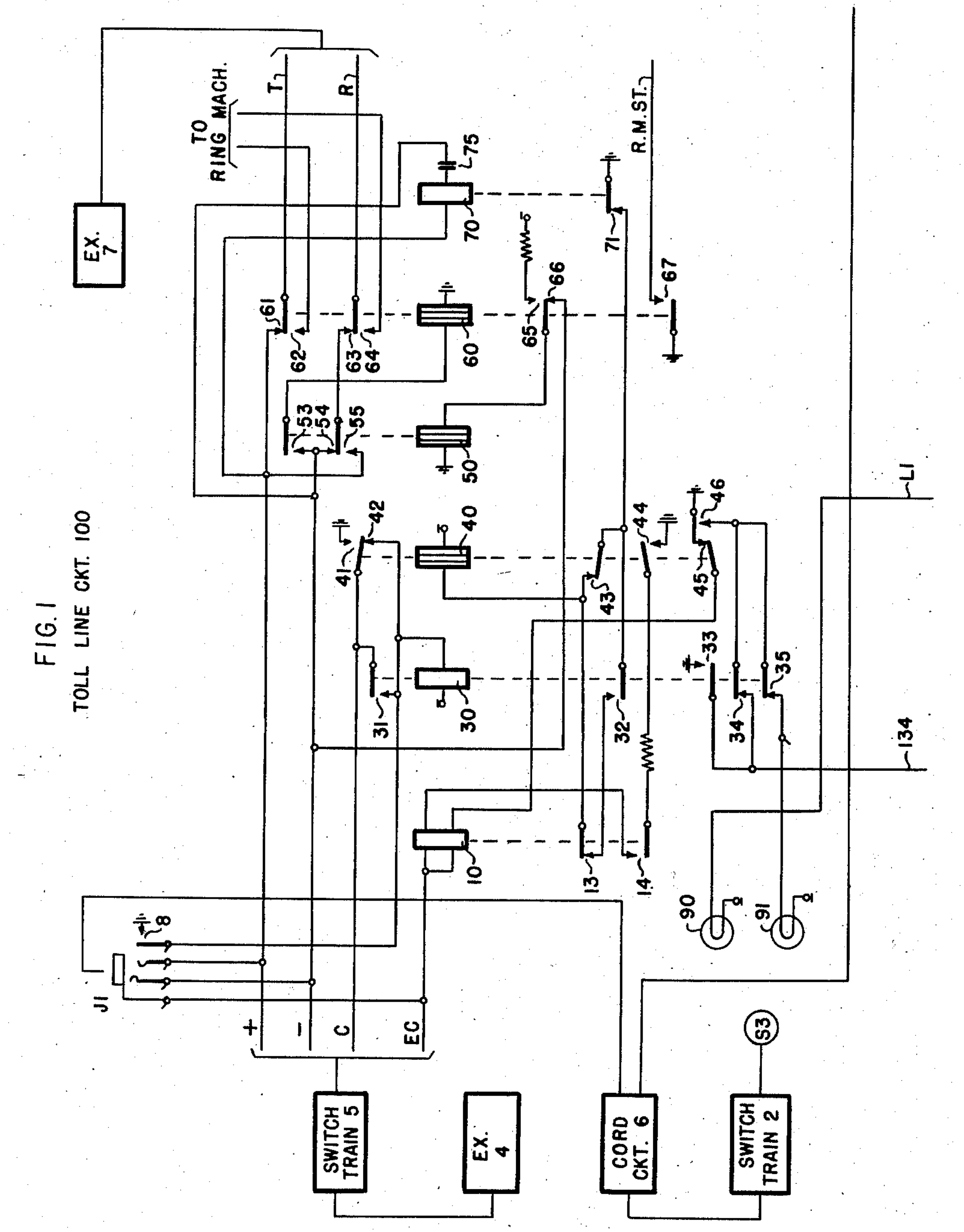

This invention relates in general to an indicating arrangement whereby equipment which is available for use by an operator is indicated as available, and which provides such indications in accordance with the sequence with which it is desirable to have such equipment operated. More particularly, the present invention relates to the use of such an indicating arrangement in a telephone system having a number of operator board positions at a central office through which respective operators have access to a large number of circuits common to all the boards for extending or receiving a call.

As a general practice the circuits are divided into groups of five or ten circuits for the purpose of providing a different preference group of circuits for any respective number of operators and which group of circuits are preferably used by an operator assigned thereto for establishing a call or connection. A busy or idle indication of the circuits in each group is provided at the boards to the operators having access to the circuits. The indications are made by lighting a lamp individual to each circuit at each operator's position. Each circuit therefore has a number of lamps common thereto for indicating its condition at a number of positions. During large portions of any twenty-four hour period most of the circuits may be in use or busy. Therefore to light lamps for each circuit to indicate a busy condition for circuits that are in use, so that an operator avoids trying to use those circuits for extending a call, results in an extremely heavy power drain. Instead only one circuit in each group is indicated as idle by lighting an idle indicating lamp individual to the circuit at each board, so that an operator, in extending a call, will attempt to use the circuit indicated as idle, and as each circuit in the group becomes busy a darkened lamp is lighted to indicate the next circuit of the group available for use. A problem arises if a busy circuit in a group becomes idle, after a succeeding circuit has been made available for use, as a transfer operation takes place whereby the first circuit becomes available for use before the succeeding circuit is taken into use. The idle indicating lamps at the boards associated with the succeeding circuit are extinguished and the first circuit idle indicating lamps are lighted. The operator may therefore become confused, as the sequence in which the lamps are lighted changes, and she is apt to make mistakes. This further creates a situation, wherein certain circuits are utilized far more frequently than others, resulting in an uneven distribution of traffic and necessitating frequent replacement or repair of the equipment most used.

The present invention avoids these problems by lighting the idle indicating lamps associated with the individual circuits in a group in a definite sequence so that the first circuit is not used until the last circuit in a group is busied. This is accomplished by means of a number of cams controlled by a group stepping switch, which advances each time a circuit in the group is busied to connect the lamps of the succeeding circuit in the group to that circuit through appropriate cam contacts, for lighting the lamps associated therewith if that circuit is idle. If the succeeding circuit is busy, the switch advances until an idle circuit is found. The operator, of course, gets no indication from a group of circuits until an idle circuit in the group is found. The operator, therefore, also knows that after an idle indicating lamp is darkened to indicate a busy condition for its associated circuit that one of the succeeding circuits will be indicated as available for use before a prior circuit unless all of the succeeding circuits are busy as a result of prior calls. If all circuits in an operator's preference group are busy she may of course utilize an idle circuit in another group.

During certain periods, when traffic is light and an indication from every circuit need not be made available to every operator, it is desirable to save power by disconnecting the lamps at certain operator boards associated with a group of circuits to which the operators at those boards do not have preference. To illustrate this phase of the invention each cam in the present arrangement has three contacts associated therewith and each of the three is arranged to control a respective arbitrary number of lamps associated with the same circuit at a corresponding number of positions through a key common to one cam contact on each cam. By operating a key in one direction or another a cam contact on each cam can be rendered effective or ineffective to control the connection of a number of lamps associated with a group of circuits at the desired boards.

The following description will proceed to describe in detail various circuits and means for extending connections to or from an operator's position merely for the purpose of providing an illustration of the types of circuits with which the present invention may function. The invention relates primarily to the circuits and other means for controlling the indicating lamps to indicate to an operator which circuits and means are available to her for use.

Fig. 1 includes a circuit diagram of a two-way toll line circuit 100 in an intermediate exchange over which an operator at an exchange such as 7 is signalled on a call being extended thereto from a subscriber such as S3 in the same exchange as toll circuit 100 or from distant exchange 4.

Figure 2:
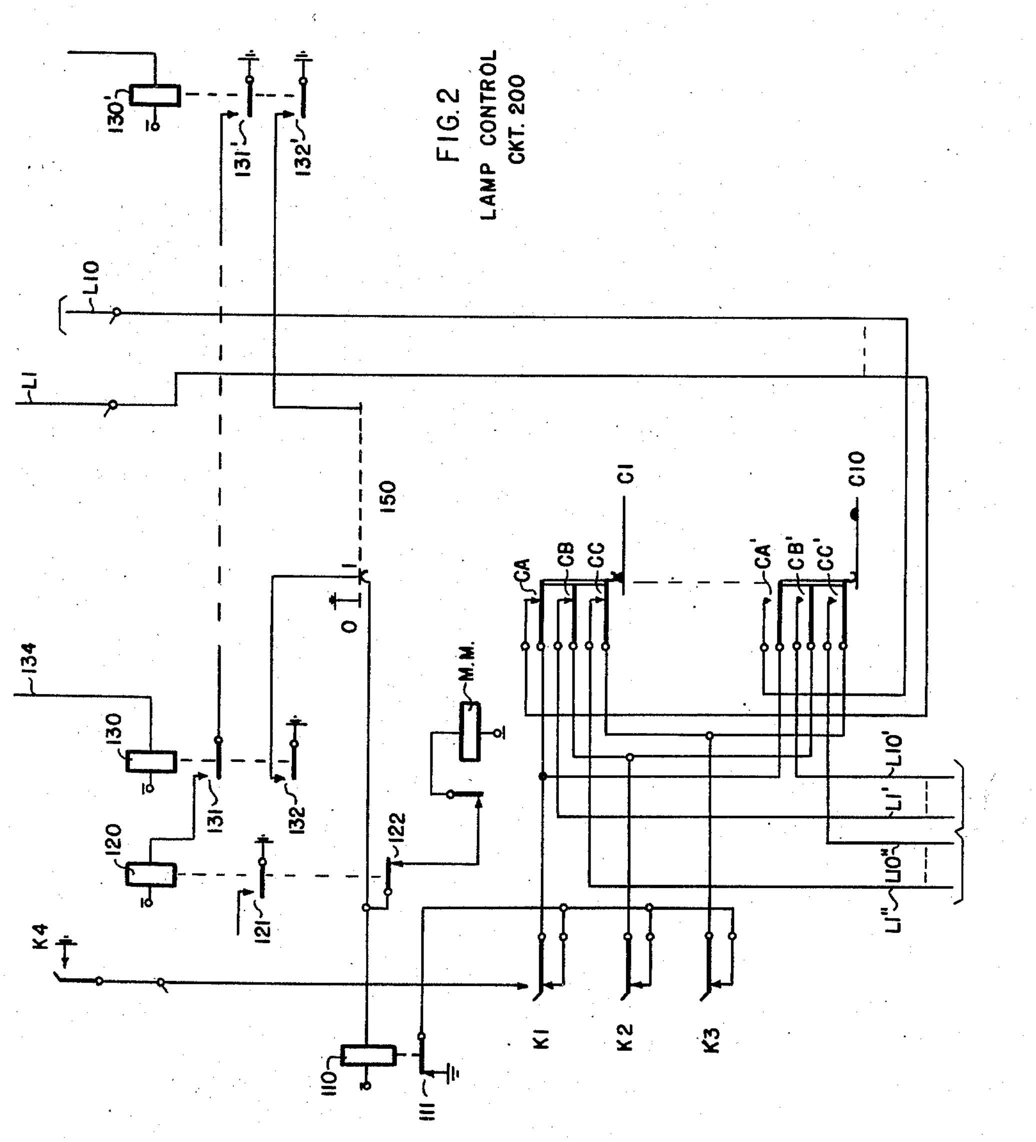

Fig. 2 discloses the lamp control circuit 200 used with ten circuits such as toll line circuit 100 and controlling the sequence in which said toll circuits are made available to the operators in the intermediate exchange having access to toll line circuits such as 100 in that exchange. It further discloses the arrangement whereby the lamps at a number of operator positions are controlled by keys K1, K2 and K3.

Fig. 3 discloses trunk circuit 300 used for extending an incoming call from exchange 7, which call reaches the operator in the intermediate exchange through a toll circuit such as 100 and her cord circuit 6, to a called subscriber such as S9 in the same exchange. The call is extended by the operator through the medium of the trunk 300. Lamp control circuit 395 is used for controlling the idle indicating lamps of the trunk circuits such as 300 for the purpose of informing an operator which trunk circuit may be used for extending a call. Lamp control circuit 395, with certain minor exceptions which will be explained, is similar to lamp control circuit 200 and is therefore shown only in block form.

As previously mentioned the circuits for permitting the extension of a call are old and well-known and are described here primarily for the purpose of illustrating the manner in which the indicating control circuits function in conjunction with ordinary commercial equipment used in a telephone system.

In this system the equipment is arranged so that a call initiated at exchange 4 may be established over switch train 5 and over a two-way toll line circuit 100 in a tandem or intermediate exchange to exchange 7. The conductors T and R between toll line circuit 100 and exchange 7 terminate in a toll line circuit similar to circuit 100 and which operates in the same manner. Switch train 5 includes a number of well-known Strowger step-by-step switches to which an operator at exchange 4 may have access through a trunk circuit such as 300 although the invention is by no means limited to a system using such switches. One of the switches is a well-known battery searching type toll transmission selector, which is arranged to extend battery over lead EC on finding an idle toll circuit, and on operation of the ringing key by the calling operator causes battery to be forwarded over the — lead to initiate a signalling operation by the toll circuit. An operator at the same exchange as toll line circuit 100 extends a call from a local subscriber such as S3 to a subscriber in exchange 7 over a cord circuit such as 6 and the toll circuit. The subscriber S3 in the intermediate exchange reaches the operator on the dialling of a predetermined digit over switch train 2 comprising any well-known type of finder selector link. The cord circuit 6 is also of any well-known type which permits an operator to complete a connection thereover. It is arranged so that battery is normally on the sleeve conductor and on operation of the ringing key or the dial also forwards battery over the ring conductor.

Calls proceeding from exchange 7 to a subscriber such as S9 in the intermediate exchange are extended to an inward operator at the intermediate exchange having access to a toll circuit such as 100, and on being signalled by the answer lamp 91 associated with toll circuit, answers to secure the desired information. She may then extend the call through a cord circuit such as 6 and a trunk circuit such as 300 to a toll train such as 390. This toll train includes a number of switches of the type described. As is standard practice the toll transmission selector is arranged to reverse battery on the — and + leads when the connector switch connects to the called line. If the called line is idle, battery remains reversed to cause a supervisory lamp (not shown) associated with the operator's cord to light and indicate the line is idle. On answer by the called party, the selector removes the battery which causes the light to darken and inform the operator that the called party has answered. She then completes the connection over her cord circuit and the toll line circuit. If the called line is busy the toll selector causes battery to be reversed intermittently to light and darken the supervisory lamp accordingly.

From the foregoing discussion it may be appreciated that large numbers of toll circuits and trunk circuits may be provided for each exchange. For each group comprising an arbitrary number of circuits there is a lamp control circuit such as 200 which controls the sequence in which the lamps associated with the circuits in a group are lighted. In the control circuit a stepping switch 150 is provided which tests for a busy or idle condition of each circuit in the group and selects an idle circuit in the group. The switch simultaneously operates a number of cams C1–C10 individually corresponding to the circuits in the group and having a number of contacts individually associated with each cam. The number of contacts on each cam corresponds to the number of operator groups or sections. Each cam closes its associated contacts when the switch wiper is on the test contact of its corresponding circuit. The lamp circuits to the various operator positions are then completed through the respective closed cam contacts if the corresponding circuit is idle. The switch is of any well-known type having a wiper which is stepped on deenergization of the self-interrupter motor magnet M. M. In the present illustration it is shown as an eleven point rotary switch as ten circuits are provided for each group and one contact is provided as a home contact. It has ground thereon to re-initiate stepping whenever the wiper is stepped home so that the switch scans all circuits in the group. The lamp control circuit 200 is similar to lamp control circuit 395 with the exception that the respective all circuit busy control relays 120 and 220′ are in the first case controlled by additional relays 130—130′ individually associated with the toll circuits in a group and in the second case directly by the trunk circuit relays. When all circuits in a group are busy a chain circuit is completed by relays such as 130—130′ to the all circuits busy relay such as 120 associated with the particular group through the aforementioned chain circuit, and when the wiper of the associated switch is stepped home, it prevents further stepping.

Circuits to all the lamps are completed through corresponding closed cam contacts, if keys K1, K2 and K3 are in the position shown in Fig. 2. It will be seen that each of keys K1, K2 and K3 controls the completion of the lamp circuits through only one cam contact on each cam so that if it is not desirable to give an indication of the circuits in this group at particular boards, the key connecting ground through the desired cam contact to the board lamps associated with the circuits in this group may be disconnected and no indication will be made thereat. This permits certain boards, which are vacated during any twenty-four hour period or those boards at which the condition of the circuits in certain groups need not be made, to be disconnected and thus conserve considerable power.

The operator positions as a general practice are divided into sections, in the present illustration three, each consisting of about an equal number of positions. Both the number of positions and sections may vary of course depending on the needs of the exchange. The circuits are divided into a number of groups for the purpose of assigning a respective preference group or groups to the operators in each section. This helps equalize traffic. At certain times of the day of course all three sections may be busy, but when traffic is less, and each operator need not receive an idle indication from any circuits but her preference group, it is desirable to save power by eliminating all but such indications. At still other times certain sections may be entirely vacated. Keys such as K1, K2 and K3 shown in lamp control circuit 200 individually corresponding to the sections are provided for each group of circuits. Thus if the operators in section 3 have no need for idle indications, from the group to which toll line circuit 100 belongs or if all operators in this section have left, the key K3, which controls the lamps at the section 3 boards of the group to which toll line circuit 100 belongs, is opened to prevent indications thereat from this group of circuits. Likewise the section 2 positions are controlled by the keys corresponding to K2 and section 1 by the keys corresponding to K1. Before all the lamps in a particular section are darkened all the corresponding section keys associated with the different groups of circuits must be opened. This permits great latitude in the number of indications to be provided at the boards. In addition key K1 is provided with a normally opened contact which is closed when K1 is operated to open the lamp circuits in section 1. Thus, at night, when traffic is light, there is no need to light any lamps until an operator needs a trunk. She can immediately find one by momentarily closing key K4 which completes the indicating circuit through the upper contact of key K1 and one of its associated cam contacts as switch 150 is already associated with an idle trunk or circuit.

Referring now to Fig. 2, when toll line circuit 100 is idle and the last toll line in the group is busy, the wiper of switch 150 is advanced to contact 1. The cams C1–C10 are also advanced to the position shown in Fig. 2. If toll line 100 is idle no ground is forwarded through contact 1 to operate relay 110, and therefore contacts 111 remain closed. Ground is forwarded from contacts 111 through the contacts of keys K1, K2 and K3, respectively, over cam contacts CA, CB and CC, respectively associated with cam C1, lines L1, L1′ and L1″, respectively, to light each idle line indicating lamp associated with toll line 100 such as 90 (Fig. 1) at each operator's position having access to toll line 100. This indicates to each operator that toll line 100 is available for use.

A toll call initiated from a subscriber such as S3 in the intermediate exchange over a switch train 2, and routed to an operator's position in any well-known manner, causes the operator at the intermediate exchange to be signalled. On being signalled she inserts the plug of her cord circuit 6 in the appropriate jack and on securing the desired information proceeds to extend a connection. If subscriber S3 desires to call a subscriber in exchange 7, the operator looks at her board for the purpose of ascertaining which one of the toll lines having access to exchange 7 has its idle indicating lamp lit. Noticing that lamp 90 or a lamp corresponding thereto of the idle indicating lamps associated with the lines having access to exchange 7, is the only one lit in the group to which she has preference, she plugs her cord circuit in at jack J1 while holding the calling party.

Ground is now forwarded from jack springs 8 to operate relay 30 and ground lead C to busy the line circuit 100 to calls over switch train 5 from exchange 4. Relay 30 closes contacts 31, 32 and 33 and opens contacts 34 and 35. Relay 40, which is maintained operated whenever the toll line is idle over a holding circuit including contacts 71 and 43, is now also energized over contacts 71, 32 and 13. At contacts 33 a circuit is completed over conductor 134 to relay 130 in the lamp control circuit 200. Answer lamp 91 remains dark as contacts 34 and 35 open. Relay 130 operates and closes contacts 131 to prepare a point in the chain circuit to the all lines busy relay 120 and at contacts 132 completes an energizing circuit over contact 1 of switch 150 to relay 110 and also over contacts 122 and the self-interrupting contacts of the motor magnet M. M. to energize M. M. Relay 110 energizes to open contacts 111 and darken the lighted idle indicating lamps corresponding to 90 associated with toll line circuit 1. Motor magnet M. M. opens its self-interrupting contacts and deenergizes to step the wiper of switch 150 to its second contact and cams C1–C10 to their second position. If the toll line circuit 100′ (not shown) is idle, there is no ground on its individual contact of switch 150 and the motor magnet remains deenergized, and lamps similar to 90 are similarly lighted over contacts of keys K1, K2 and K3 and conductors similar to L1, L1′ and L1″. The lamps associated with cam C2 (not shown) and toll line 100′ are lighted in a similar manner to that described for the lamps associated with toll line 100 and cam C1. If, however, toll line 100′ is busy, ground is forwarded from contacts corresponding to 132 closed by a relay corresponding to 130 through its individual bank contact of 150 to operate relay 110 and energize M. M. for stepping the wiper of switch 150 to the succeeding bank contact. In this manner switch 150 is operated until an absence of ground is found. Thus the switch must continually move forward, and when the last toll line in the group is busy the wiper of switch 150 is advanced to contact 0, where ground completes an obvious energizing circuit to relay 110 and M. M., which energizes to step the wiper to contact 1.

This ensures an even distribution of traffic over the toll lines as they are made available in sequence, and brought into use by an operator only when the associated idle indicating lamps are lighted over a circuit similar to that already described for lighting lamp 90. Cams C1–C10 are also advanced each time the switch advances to allow the cam contacts associated with a particular cam to open and the contacts associated with the succeeding cam to close. Thus as switch 150 tests each circuit a cam individual to that circuit closes contacts associated therewith to control the idle indicating lamps associated with that circuit for the purpose of informing the operator that the line is available.

If all circuits in a group are busy, relays 130 and 130′ and all relays corresponding thereto are operated to close contacts 131 and 131′ and the contacts corresponding thereto. A chain circuit is then completed to relay 120 which operates to close contacts 121 and register an all trunks busy signal. At contacts 122 it opens a point in the energizing circuit to the magnet M. M. so that when it reaches its home position ground is not forwarded to operate the magnet and the switch remains in its home position until one of the circuits becomes idle and opens the circuit to relay 130 so that it releases to initiate stepping of the switch.

Keys corresponding to K1, K2 and K3 are provided for each group of ten circuits. During busy portions of the day when all positions are filled, and indications must be provided thereat, all keys are as shown in Fig. 2. The general practice is for the positions to be grouped into a number of sections individually corresponding to keys K1, K2 and K3. If traffic becomes very light one or more of the keys of each group or any desired group of circuits may be opened to prevent a signal from the same group of circuits being given at all boards. When all the section 3 positions are vacated all the section 3 lamps are extinguished by opening all the K3 keys. Section 2 board lamps controlled by keys corresponding to K2 may be handled in the same way. During the night period when traffic is light when the remaining operators may be required to provide other types of service it is not desirable to always provide an indication to the operators of an idle trunk or circuit. Therefore when all keys corresponding to K1 are open and an operator has need for an idle circuit, she merely operates the key corresponding to K4 of the circuit group through which she desires to extend a connection. The switch 150 is of course associated with an idle circuit in a manner already described so that when key K4 is operated ground is forward through the upper contact of key K1 and the appropriate cam contact to light a lamp associated with an idle circuit in the group at her board in a manner already described, and she then proceeds to utilize the idle circuit.

Returning now to toll line circuit 100, battery is forwarded over the sleeve conductor from cord 6 in the well-known manner, when the operator inserts her plug, through the lower winding of relay 10 and contacts 45 to ground to energize relay 10. Relay 10 closes contacts 14 and opens contacts 13, the latter opening one of the described circuits to relay 40. It remains operated, however, over contacts 71 and 43. At contacts 14 no circuit is completed at present and its purpose will be explained later in the description. Battery is forwarded momentarily from the ring conductor through contacts 66 to ground through relay 50, when the operator initiates a ringing operation to signal an operator at exchange 7. Relay 50 operates to close contacts 53 and 55. Closing of contacts 53 now connects ground through the winding of relay 60 to battery on the ring conductor in shunt with relay 50. Relay 60 operates to disconnect the winding of relay 50 from battery at contacts 66 and completes another circuit to energize relay 50 at contacts 65. Relay 50 is slow-to-release and maintains its contacts operated while its operating circuit is transferred from contacts 66 to 65. At contacts 67, relay 60 completes a circuit in any well-known manner for initiating operation of a ringing machine (not shown). At contacts 62 and 64, relay 60 applies A. C. current from the ringing machine to conductors T and R, respectively, to signal the operator at called exchange 7 through a circuit similar to toll line circuit 100. The manner in which the operator at exchange 7 is signalled through the toll line circuit thereat will therefore be explained later as though it were an incoming call to toll line circuit 100.

An operator at exchange 4 having direct access to exchange 7 on a toll call operates switch train 5 for the purpose of connecting to a toll line circuit connected to exchange 7. An inter-toll selector switch which is part of the switch train searches for battery over lead C, contacts 42, and the winding of relay 30. On finding battery, indicating that the toll line is idle, ground is placed on lead C in the well-known manner by the inter-toll selector to operate relay 30 which closes contacts 33 for the afore-described purpose of advancing the lamp control switch 150 to light the idle indicating lamps associated with the next idle toll line circuit. Battery is also automatically extended over lead EC by the inter-toll selector to energize the lower winding of relay 10 as previously described. Battery is also momentarily extended on the — lead to operate relay 50 as previously described, when the operator at exchange 4 manipulates her ringing key, and relay 50 in turn operates relay 60 as before described to in turn apply ringing current to signal the operator at called exchange 7.

The operator having access to the line circuits over cord 6 operates her ringing key only momentarily to apply battery to the ring conductor for a like period, and the inter-toll selector likewise controls the application of battery to the — lead so that it is on only momentarily. Relay 60 thereafter releases to open contacts 65 and releases relay 50. Both are slow-to-release but relay 60 releasing first disconnects the ringing current while relay 50 short circuits the loop momentarily at contacts 55 to remove any charge left on the line capacitance by ringing current before it restores. The operator at exchange 7 on being signalled in a manner to be explained extends the connection to the desired called party and thereafter completes part of the talking loop from the called party through her cord circuit over conductor R, contacts 61 and 54, the — lead over switch train 5 to the operator's cord circuit at exchange 4 and back over switch train 5, the + lead and contacts 61 and conductor T, or, if the call originated with an operator utilizing cord circuit 6, the talking circuit includes the tip and ring conductors and excludes the switch train 5. The operator at exchange 4 or the one having access to cord circuit 6 respectively then completes the talking loop to the calling party through their respective cord circuits. Relay 30 remains operated to maintain relay 130 operated and ground bank contact 1 to prevent the wiper of switch 150 from halting thereon so that the idle indicating lamps associated with this circuit cannot be lighted to indicate the trunk is available for use. This condition is maintained until the line circuit is idled as will be explained.

An incoming call from exchange 7 proceeds in one of the manners just described through a toll line circuit similar to 100, and A. C. ringing current momentarily applied as previously described for a toll line circuit similar to 100 at exchange 7 over lead T, contacts 61, winding of A. C. relay 70, condenser 75, contacts 54 and 63 back over conductor R operates relay 70. Relay 70 opens contacts 71 to open the operating circuit to slow-to-release relay 40. Relay 40 releases to close contacts 41 and ground lead C for the purpose of busying the circuit to any inter-toll selector and prevent its seizure thereby. At contacts 43 it opens another point in its operating circuit and at contacts 44 prepares a point in a circuit to the upper winding of relay 10. Contacts 46 close to forward ground over contacts 35 for lighting the answer lamps such as 91 at all inward operator positions having access to the line 1 through a cord circuit such as 6. A circuit is also completed over contacts 46, 34 and conductor 134 to operate relay 130, which completes the afore-described sequence of operations for lighting the idle indicating lamps associated with the next idle line circuit if the switch 150 had been standing on the contact associated with the seized line circuit. Otherwise it grounds contact 1 to prevent switch 150 from stopping there. The operator plugs cord circuit 6 into jack J1 to operate relay 30 as aforedescribed. Relay 30 locks up over contacts 31 and 41 and opens the circuit to answer lamp 91 at contacts 35 so that it is extinguished. It opens the just described circuit to relay 130 at contacts 34 but at contacts 33 completes an already described circuit for maintaining relay 130 operated. Relay 70 which is operated only momentarily, as the ringing current is on only for a short period, has by now released to close contacts 71 so that relay 40 is operated over an aforedescribed circuit including contacts 32 and 13 and completes its holding circuit over contacts 71 and 43. Relay 10, the lower winding of which is now energized from battery on the sleeve conductor and ground at contacts 45 now prepares its upper winding for disconnect supervision, and at contacts 13 opens one of the circuits to relay 40. Relay 40 also opens the circuit to relay 30 at contacts 41, but relay 30 is held operated from ground at jack springs 8 which also busies the line by grounding the C lead. The operator having access to cord 6 may now complete a talking loop to the operator at exchange 7 over conductor T and contacts 61 and conductor R and contacts 63 and 54 to secure the called party's number.

To extend the connection the operator glances at her board for the purpose of finding an idle trunk circuit such as 300 having access to a toll train such as 390 for extending a connection to a subscriber such as S9. She notices that the idle indicator lamp 302 associated with trunk circuit 300 is lighted indicating that the trunk is available for the purpose of extending a call. While maintaining one plug of cord circuit 6 in jack J1, she connects the other plug of cord circuit 6 through jack J2 to trunk circuit 300. Battery on the sleeve conductor is forwarded through the upper winding of relay 230 to ground and it operates to close contacts 231, 232, 234, 236 and 238 and open contacts 233 and 235. Contacts 301 on closing complete a circuit through the upper winding of relay 220 and it closes contacts 221, 223, 224, 225 and 226. The operator's tip and ring conductors are now connected in a loop over contacts 232 and 234, respectively, the upper winding and contacts 247 and the lower winding of the primary of coil 266, respectively, to ground at contacts 226. The — lead is connected over contacts 271 and 224 through the upper winding of the secondary of coil 266, lower winding of relay 240, contacts 243 shunting the lower winding of relay 260, the lower winding of the secondary of coil 266, contacts 236 and 275 to the + lead to complete a circuit to the line relay (not shown) associated with trunk 300. This causes the first switch of the toll train 390 to hunt for and find the trunk circuit 300 in the well-known manner. Relay 240 is polarized by the circuit completed through its upper winding from ground at contacts 231 and does not operate. At contacts 222 ground is forwarded over a conductor 284 similar to 134 to operate a relay similar to 130 in lamp control circuit 395 for initiating a series of operations similar to that already described for lamp control circuit 200. In the present instance, however, a chain circuit to the all lines busy relay 120′ is prepared directly from contacts 221 instead of the contacts of a relay corresponding to 130. A circuit is also completed from battery at the cord circuit supervisory lamp over the sleeve conductor, contacts 238 and the low impedance lower winding of relay 230 to ground at contacts 246 to light a supervisory lamp associated with her cord circuit to inform the operator that she may dial.

The operator now operates her dial to cause the switches of the toll train 390 to select the called subscriber S9. When she turns the dial off-normal, the sleeve conductor is opened in any well-known manner, and relay 230 deenergizes to close contacts 233 and 235 and open contacts 232 and 234. The supervisory lamp of course extinguishes as contacts 238 open. The operator's dial springs are now connected directly to the + and — leads over contacts 275, 235 and 271, 224 and 233, respectively, so that the respective line relays of the switches in the toll train are pulsed in the well-known manner. The circuits to both windings of relay 240 are open when relay 240 is restored. Relay 230 operates, however, at the end of each digit, but as both windings of relay 240 are then energized it does not operate.

At the end of the dial operation, the toll train 390 is connected to the line of subscriber S9, and relay 230 remains operated. When the connector connects to the called line, battery is reversed on the + and − leads in any well-known manner and relay 240 operates as both of its windings are now energized to aid each other. It closes contacts 242 to shunt its lower winding and by opening contacts 243 removes the shunt from the lower winding of relay 260. Relay 260 operates with the aid of a pre-energizing circuit for the upper winding of relay 260 completed through resistance R when contacts 245 close. At contacts 246 ground is removed to extinguish the cord circuit supervisory lamp. At contacts 248 a circuit to relay 270 is prepared so that the called party can be rung. At contacts 249 a ground is provided for maintaining the trunk 300 busy in the lamp control circuit 395. At contacts 241 a holding circuit is completed over contacts 251 from ground at contacts 231 to the upper winding of relay 240. Relay 240 on operating provides another ground at contacts 264 for maintaining trunk circuit 300 busy at the lamp control circuit. At contacts 261 it prepares a holding circuit to its upper winding. At contacts 262 it opens the circuit to the lower winding of relay 220, and at contacts 263 it completes a circuit through the lower winding of relay 230 and contacts 238 for relighting the supervisory lamp to indicate to the operator that she may ring the called party.

The operator then operates her ring key momentarily to place battery on the ring conductor to complete a circuit over contacts 234, lower primary winding of coil 266, contacts 248, the winding of relay 270 to ground at contacts 226 to operate relay 270. At contacts 274 it applies an operating ground for initiating operation of the ringing machine. At contacts 271 and 276 it applies A. C. ringing current to the + and − conductors to signal the called party. At contacts 273 it completes a holding circuit over contacts 261 to the upper winding of relay 260 so that it does not release when the energizing loop to its lower winding is opened at contacts 271 and 276. At contacts 277 a circuit to slow-to-release relay 250 is completed, and it operates to close contacts 252 which provide an alternating holding ground for the upper winding of relay 260. It shunts the secondary of repeating coil 266, contacts 242 and the lower winding of relay 260 at contacts 253. The ring key being released removes battery from the ring conductor to restore relay 270. At contacts 277 the circuit to relay 250 is opened and it releases. Relays 270 and 250 respectively release the holding circuits to the upper winding of relay 260 in that sequence at contacts 273 respectively. At contacts 271 and 275 the + and − conductors are of course reconnected to the repeating coil and the ringing machine disconnected at contacts 274, 272 and 276. The operator may reoperate her ring key as often as she desires to operate relay 270 and signal the called party. The called party coming on the line disconnects his ringer, and causes the toll transmission selector to remove battery and ground from the + and − leads, respectively, so that with relays 270 and 250 restored, no energizing loop exists through the lower winding of relay 260 and it restores to extinguish the supervisory lamp so that the operator knows the call is answered and she extends the talking circuit from the + and − leads to repeating coil 266, contacts 232 and 234, respectively, and thence over cord circuit 6 and the aforedescribed line circuit 100 to the calling party.

In the event the called line was busy when the toll train was connected thereto, the toll transmission selector reverses battery on the + and − leads as before described to operate relay 260. The battery and ground potentials, however, are applied back over the + and − leads intermittently at the rate of 60 interruptions per minute to cause relay 260 to pulse. This flashes the supervisory lamp at contacts 263 to inform the operator that the called line is busy. She may now release the connection.

On termination of the conversation, when the called party hangs up, the selector reconnects battery and ground potentials to the + and − leads to operate relay 260 to light the supervisory lamp. The operator removes her plug from the jack J1 to open the circuits to relays 220 and 230. The repeating coil is disconnected from the + and − conductors at contacts 224 and 234 and the switches of the toll train release in the well-known manner. At contacts 221 a point is opened in the chain circuit to the all lines busy relay 220' in the lamp control circuit 395. At contacts 223 and 231 the circuit to the upper winding of relay 240 is opened and it restores to open contacts 245 so that the pre-energizing circuit to the upper winding of relay 260 is opened. The release operation in the event the called line is busy or does not answer proceeds in much the same way, except that relays 240 and 260 are operated. They release, however, on release of relays 230 and 220 as just described. It will be noticed that ground is maintained on lead 284 for keeping trunk 300 busy in the lamp control circuit from contacts 249 and 264 until their respective relays restore at the end of the release operation.

Release of toll line circuit 100 is accomplished by either operator having access to toll line circuit 100 through cord circuit 6 or switch train 5 operating her ring key to operate relays 50 and 60 in turn as before described. This causes A. C. ringing current to be applied over T and R as before described to operate a relay corresponding to 70 connected thereto at the other exchange as before described. Ground is removed at contacts corresponding to 71 from a relay such as 40 at the other exchange and it releases. The operator at the other exchange is signalled as before described for toll line circuit 100 and the operators at both exchanges may now remove their plugs. As before described on a signalling operation relay 40 is deenergized only for the period 70 is operated, and as it restores before the operator removes her plug, relay 40 is reoperated and remains operated while the circuit is idle. Relay 30 of course releases on removal of the plug. Ground is maintained on lead 134 at contacts 33 to busy the line circuit in lamp control circuit 200 until relay 30 releases when the operator removes her plug.

I have described in detail a system for economically indicating available equipment to an operator and an arrangement for distributing the use of such equipment in the most practical manner.

What is claimed is:

1. For use in a telephone system having a plurality of circuit means accessible from a number of operator positions for extending respective connections, means operated to test said circuit means in a definite sequence for selecting an idle one thereof, an indicator individually corresponding to each circuit means at each operator position, means operated by said selecting means on selection of an idle one of said circuit means for operating the indicator individually corresponding thereto at each operator position to thereby indicate to each operator the preferred circuit means for extending a connection, and means for operating said selecting means to select a succeeding idle circuit means when said selected circuit means is seized for extending a connection.

2. An arrangement such as described in claim 1, in which said means for operating said indicator at each position comprises a plurality of circuits individually corresponding to a different group of positions and all of which are associated with said selected idle circuit means, and means operated by said selecting means on selection of said idle circuit means for completing said plurality of circuits to operate the indicators individually corresponding to said selected idle circuit means.

3. In an arrangement such as described in claim 2, switch means individually associated with each circuit of said plurality of circuits and operated for disconnecting its individually associated circuit to prevent the completion of a circuit of the indicators corresponding to the selected idle circuit means at the corresponding group of positions.

4. In an arrangement such as claimed in claim 1, a control means associated with each circuit means for rendering an indicator individually corresponding to each circuit means ineffective to indicate the condition of its associated circuit means.

5. For use in a telephone system having a plurality of circuit means accessible to a number of different operators for extending respective connections, means operated for selecting an idle circuit means, an indicator at each position individually corresponding to each circuit means, means operated on selection of an idle circuit means for operating the indicator individually corresponding thereto at each operator's position to thereby indicate to each operator the preferred circuit means for extending a connection, and means for operating said selecting means to select the first succeeeding idle circuit means before any other idle circuit means is selected when said selected circuit means is seized for extending a connection.

6. For use in a telephone system having a plurality of circuit means accessible to a number of operator positions for extending a connection, a switch, an indicator at each position individually corresponding to each circuit means, means operated when one of said circuit means is busy for operating said switch, means operated by an idle one of said circuit means for terminating operation of said switch, and means operated in response to the termination of said switch operation for operating the indicator at each position individually corresponding to said idle circuit means to indicate to each operator the preferred circuit means for extending a connection.

7. An arrangement such as described in claim 6, in which said means for operating the indicators comprises a plurality of circuits, a cam having contacts individually corresponding to said last circuits and arranged to be closed when said switch is associated with said idle circuit means for completing said circuits to the indicator at each position.

8. A combination arranged for use in a telephone system having groups of trunks accessible to operator positions arranged in groups, each position having an indicator thereat individual to each trunk, a selecting means associated with each group of trunks and operated in a predetermined sequence to select an idle trunk in its associated group, means associated with each said selecting means and operated thereby and by a selected idle trunk in the associated group for operating the indicator at each position corresponding to said selected idle trunk to provide an indication to each operator of the preferred trunk for extending a call, and a plurality of devices associated with each group of trunks and individually associated with each group of operator positions, said devices individually operated for rendering the indicators at the individually associated groups of positions ineffective to provide an indication thereat from the associated group of trunks.

9. A combination such as claimed in claim 8, in which said means associated with each selecting means comprises a plurality of cams operated by the selecting means, each cam individually corresponding to one trunk in its associated group of trunks, and means operated by the cam corresponding to a selected idle trunk for operating the indicator corresponding to said selected idle trunk at each position to thereby provide an indication of the trunk preferred for extending a call.

References Cited in the file of this patent

UNITED STATES PATENTS

| | | |
|---|---|---|
| 1,594,877 | Currier et al. | Aug. 3, 1926 |
| 1,639,135 | Johnson et al. | Aug. 16, 1927 |
| 1,695,057 | Murphy | Dec. 11, 1928 |